June 18, 1963  J. PETRONE  3,094,264
TRAY FOR FOOD AND DRINK
Filed Feb. 1, 1961  3 Sheets-Sheet 2

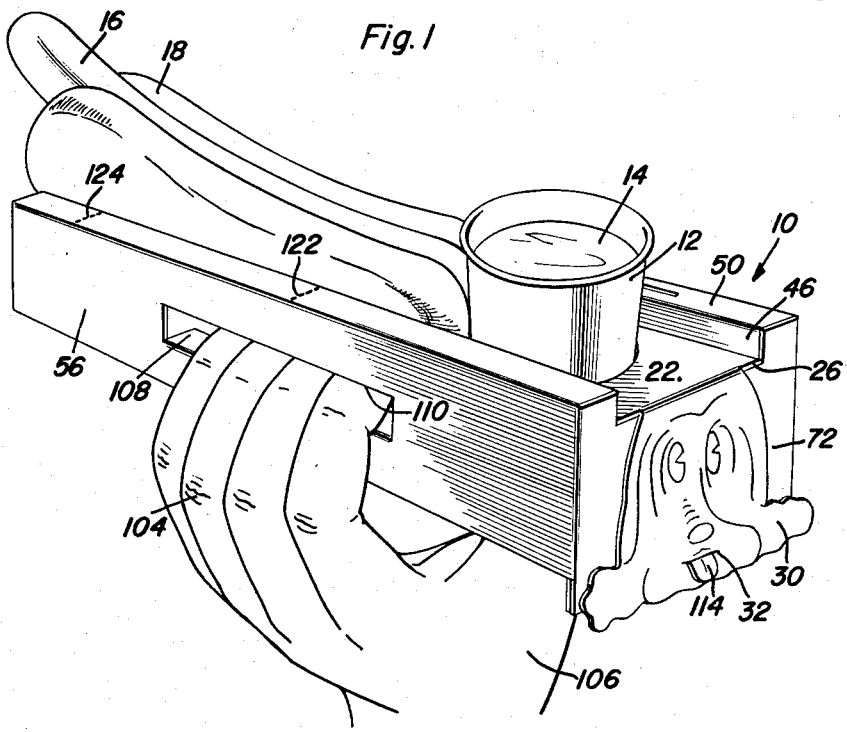
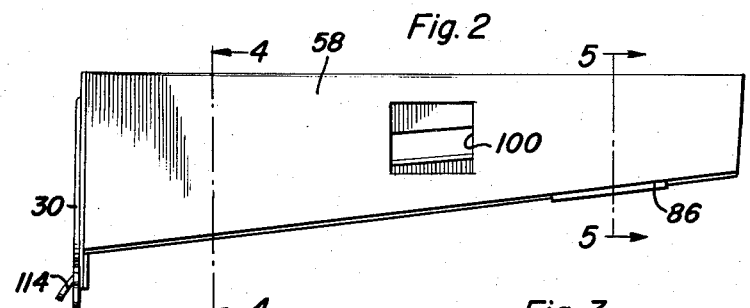
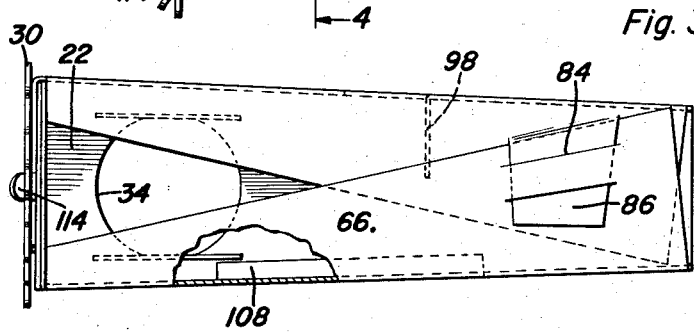
John Petrone
INVENTOR.

John Petrone
INVENTOR.

BY *Clarence A. O'Brien*
*and Harvey B. Jacobson*
Attorneys

June 18, 1963  J. PETRONE  3,094,264
TRAY FOR FOOD AND DRINK
Filed Feb. 1, 1961  3 Sheets-Sheet 3

John Petrone
INVENTOR.

United States Patent Office 3,094,264
Patented June 18, 1963

3,094,264
TRAY FOR FOOD AND DRINK
John Petrone, 108 Columbia St.,
Huntington Station, N.Y.
Filed Feb. 1, 1961, Ser. No. 86,372
8 Claims. (Cl. 229—16)

The present invention generally relates to a portable tray for both a beverage and a consumable article of food such as a hamburger or a frankfurter generally referred to as a hot dog.

In many instances, hamburgers and hot dogs are eaten while a person is standing or seated in an area where there is no table-like support. For example, in the stands at athletic events such as football games, baseball games and the like, vendors quite often sell hot dogs and beverages. However, it is quite difficult to maintain proper control and support for both the beverage and the food product. There are many other instances in which the articles such as a hamburger or hot dog is normally served with a beverage and presents considerable problems in supporting both the beverage and the food at the same time. Therefore, it is the primary object of the present invention to provide a highly effective portable tray which will effectively support either a hot dog or a hamburger and a beverage and at the same time provide adequate support for these articles thereby facilitating the consumption of the articles. The structure is such that the tray may be supplied in a knockdown compact position and readily set up for use, the tray also being relatively inexpensive to manufacture whereby they may be discarded after a single use.

Still another object of the present invention is to provide a portable tray for a tumbler containing a liquid and a combined hot dog and bun or roll, which with very little modification will also support a hamburger and a beverage.

Another important feature of the present invention is the provision of the portable tray having mounted on one end thereof, a novel and somewhat amusing representation of a dog in the form of the invention supporting a hot dog and a bull on the form of the invention for supporting a hamburger in which a portion of the tray projects outwardly through the end flap which forms the animal representation thereby simulating the tongue of the animal.

These together with other objects and advanatges which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view of the portable tray of the present invention in use in supporting a hot dog, a hot dog roll and a beverage container;

FIGURE 2 is a side elevational view of the construction of the tray taken from the side opposite to that shown in FIGURE 1;

FIGURE 3 is a bottom plan view of the construction of FIGURE 2 with portions thereof broken away;

Figure 4:
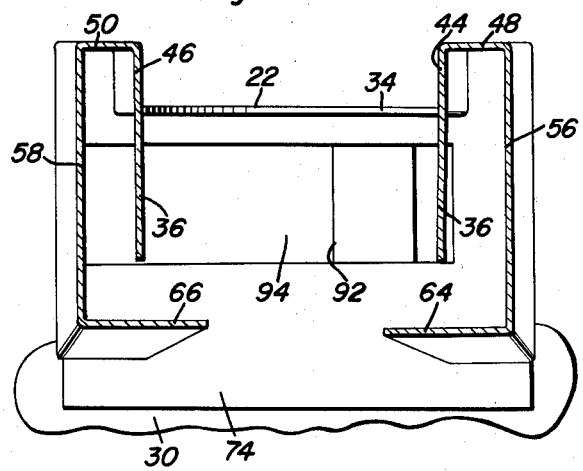
FIGURE 4 is a transverse, vertical sectional view taken substantially upon a plane passing along section line 4—4 of FIGURE 2 illustrating further structural details of the invention.
Figure 5:
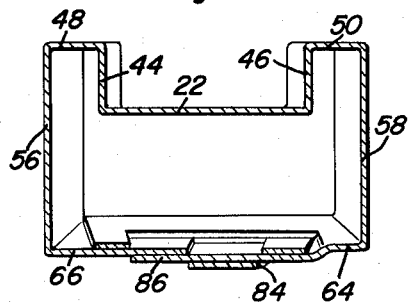
FIGURE 5 is a transverse, vertical sectional view taken substantially upon a plane passing along section line 5—5 of FIGURE 2 illustrating further structural details of the mechanism for retaining the tray in assembled condition.

Referring now specifically to the drawings, the numeral 10 generally designates the tray of the present invention for the purpose of supporting a receptacle 12 in the form of a paper cup, glass tumbler or the like which contains a liquid 14 in the form of a beverage of any suitable type. Also supported on the tray 10 is a hot dog or frankfurter 16 received in the conventional manner in a bun or hot dog roll 18. For purposes of distribution, the hot dog and roll combination may be encased in a suitable wrapping of wax paper or the like. The tray 10 is specifically adapted to effectively support the beverage and the hot dog in position so that the same may be more easily supported and handled.

Figure 6:
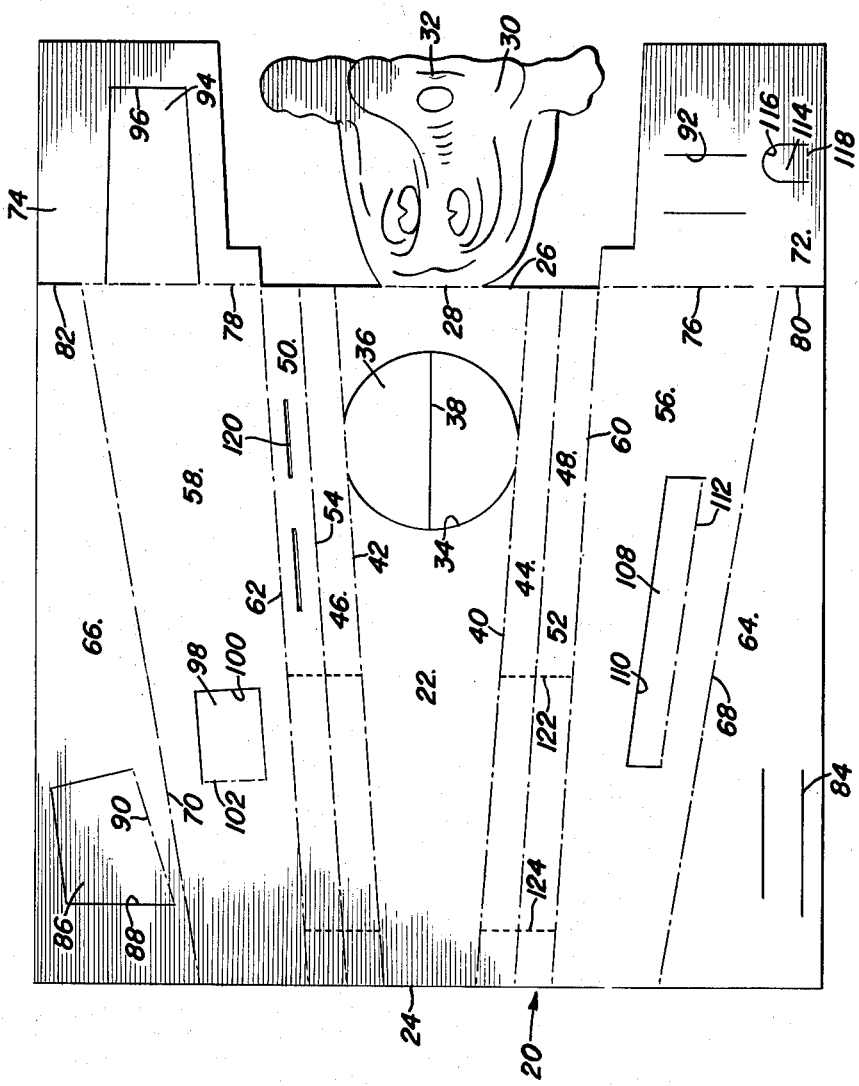
FIGURE 6 is a plan view of the blank from which the tray is formed.

Referring now specifically to FIGURE 6, the numeral 20 generally designates the blank from which the tray of the present invention is constructed and the blank is generally rectangular in configuration and may be constructed of any suitable cardboard, stiff paper or similar material such as would be relatively inexpensive and easily foldable and set up so that the tray may be economically employed as a disposable device.

The blank 20 includes a centrally disposed longitudinally extending main supporting panel 22 which has a narrow end 24 and a wide end 26 with the side edges diverging from the narrow end to the wide end. Attached to the wide end 26 by virtue of a fold line 28 is the pictorial representation of the head of a dog designated by numeral 30 and including a slit 32 in the area of the mouth. The shape of the simulated head 30 may vary and the pictorial indicia thereon may vary but generally, the indicia thereon should depict a distinctive appearance so that customers will enjoy observing the simulated head 30.

Adjacent to but spaced from the longer end edge 26 is a circular cut-out 34 for receiving the receptacle 12. The circular cut-out 34 is normally closed by a pair of semi-circular flaps 36 separated along a diametric cut line 38 and having the outer tangential edges thereof connected with the respective fold lines 40 and 42 which form the side edges of the main supporting panel 22. Thus, the container 12 may be inserted into the circular cut-out area 34 by merely projecting the bottom end of the container therethrough which will force the flap 36 downwardly along the fold lines 40 and 42 and these flaps will serve to frictionally grip and stabilize the container while in the circular cut-out area.

Formed integrally with the main supporting panel 22 is a pair of relatively narrow vertical panels 44 and 46 which form a vertical wall for retaining the hot dog and bun in position. The vertical panels 44 and 46 are connected with the main supporting panel 22 along the fold lines 40 and 42. Connected with the vertical panel 44 and 46 are a pair of horizontal panels 48 and 50 joined to the panels 44 and 46 along fold lines 52 and 54.

Attached to the outer edges of the horizontal panels 48 and 50 is a pair of outer vertical wall panels 56 and 58 connected to the panels 48 and 50 respectively by fold lines 60 and 62. The fold lines 40, 52 and 60 are parallel with each other as are the fold lines 42, 54 and 62.

Connected to the outer edges of the panels 56 and 58 respectively is a pair of bottom forming panels 64 and 66 connected to the panels 56 and 58 respectively by fold lines 68 and 70 which are substantially parallel to the fold lines 60 and 52 respectively but diverge somewhat in relation thereto toward the longer end edge 26 of the main panel 22. Attached to the end edges of the vertical side wall panels 56 and 58 respectively is a pair of end panels 72 and 74 connected to the panels 56 and 58 respectively along fold lines 76 and 78 which generally are extensions of the end edge 26. The end edges of the panels 64 and 66 are separate from the panel 72 and 74 by slits 80 and 82 whereby the end panels 72 and 74 may be disposed in overlapping relation to each other.

When setting up the blanks, the blank is folded along the various fold lines so that the adjacent panels are disposed in perpendicular relation to each other. The main body panel 22 is horizontal, the panels 44 and 46 extend upwardly vertically therefrom, the panels 48 and 50 extend horizontally outwardly from the top edge of the vertical panels 44 and 46, the outer wall panels 56 and 58 extend vertically downwardly from the outer edge of the horizontal panels 48 and 50, the bottom panels 64 and 66 extend horizontally inwardly in parallel relation to the body panel 22 and spaced vertically therebelow, the end panels extend inwardly into overlapping relation to each other, and the simulated head 30 extends in overlying relation to the end panels 72 and 74.

For retaining the device in assembled condition, the bottom panel 64 is provided with a pair of generally parallel slits 84 for receiving a tab 86 formed from the panel 66. The tab 86 is formed by cutting three edges thereof along a cut line 88 with the other edge being connected to the panel 66 by fold line 90 whereby the tab 86 is generally trapezoidal in configuration and is adapted to be inserted through the slits 84 thereby retaining the bottom panels 64 and 66 in superimposed relation as illustrated in FIGURE 3.

For retaining the end panels 72 and 74 in superimposed overlapping relation, the panel 72 is provided with a pair of parallel slots 92 while the panel 74 is provided with an elongated locking tab 94 formed by cutting out the locking tab 94 along a cut line 96 along three edges thereof and having the other edge of the tab 94 formed coincidental with the fold line 78 whereby the locking tab 94 is adapted to be inserted through the parallel slits 92 for locking the end panels 72 and 74 in overlapping relation in substantially the same manner as are the bottom panels 64 and 66.

The vertical side wall panel 58 is provided with a tab 98 formed by cutting three edges thereof by a cut line 100 with the other edge forming a fold line 102 whereby an opening is formed in the panel 58 when the tab 98 is forced inwardly for receiving the thumb of a person's hand 106 holding the tray as illustrated in FIGURE 1. On the other side wall panel 56, there is provided an elongated tab 108 formed by cutting along three side edges by cut line 110 and leaving the other edge attached along a fold line 112 thus forming an elongated opening for receiving the fingers 104 of the hand 106 in opposition to the thumb thereby providing means for securely gripping the tray 10.

In the blank construction, the end panel 72 is provided with a tab 114 adjacent the outer edge thereof which is formed by a generally U-shaped cut-out along the cut line 116 with the tab being connected to the panel 72 along a fold line 118 whereby the tab 114 is of a width to extend through the slit 32 and will simulate the tongue of the animal simulated by the head 30. The depiction of the head 30 may vary and may be in the form of a dog, bull or any other suitable animal. For example, decals may be placed thereon by individual proprietors to render the tray more effective and attractive.

The top horizontal panel 50 is provided with a pair of slits 120 for receiving napkins, spoons or other relatively thin articles that may be employed in conjunction with either the beverage in the container 12 or the article of food.

Figure 8:
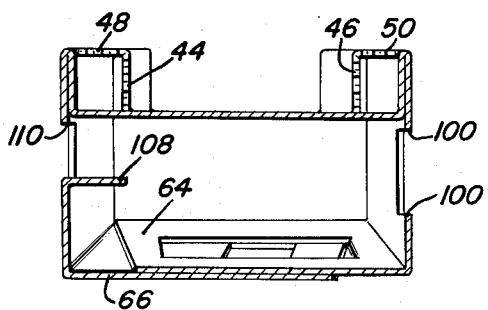
FIGURE 8 is a transverse, sectional view taken substantially upon a plane passing along section line 8—8 of FIGURE 7 illustrating further structural details of this form of the invention.

Extending across the vertical wall panels 44 and 46 and the horizontal top panels 48 and 50 is a pair of perforated lines 122 and 124 which are in spaced parallel relation to each other and are adapted to be severed whereby the area of the panels 44—50 may be disposed inwardly of the remainder of the panels 48—50 for forming an area for receiving a relatively cylindrical article such as a hamburger. In this arrangement, the portion of the panels 44 and 46 disposed between the perforated lines 122 and 124 which form a horizontal extension of the main supporting platform while the portion of the panels 48 and 50 between the perforated lines 122 and 124 would form an outer vertical wall for confining the hamburger. This arrangement of components is illustrated in FIGURE 8 and in this form of the invention, a simulated bull's head 126 is provided on the head panel 130. Otherwise, the construction is the same except that the position of the thumb receiving opening and the finger receiving opening formed by the tabs 98 and 108 respectively are reversed for use by a person normally holding the tray in his left hand.

Figure 7:
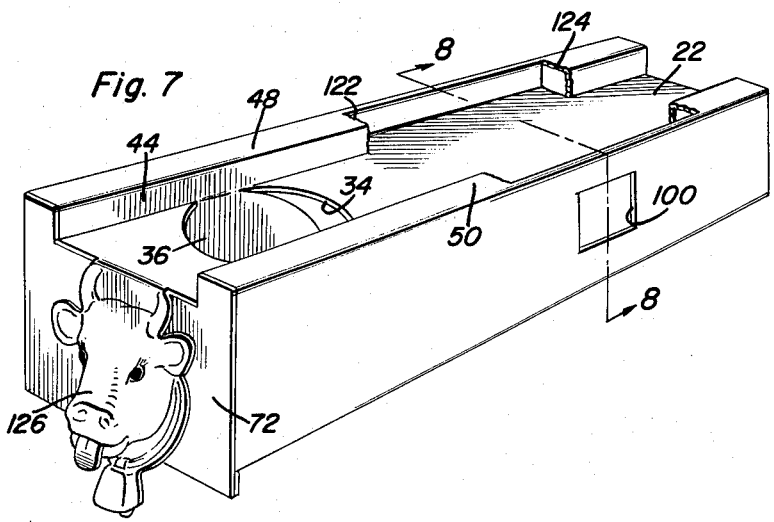
FIGURE 7 is a perspective view of a form of the tray employed for supporting a hamburger.

The convergence of the wall panels 44 and 46 toward the narrow end edge 24 of the panel 22 will effectively form a stop to frictionally grip and retain the hot dog roll and hot dog in place on the top surface of the supporting panel 22. Also, the container disposed adjacent the other end of the supporting area will effectively prevent the hot dog from becoming dislodged in this direction when the container is in position. When the device is used for supporting a hamburger, the edges formed by the cut serrated lines will effectively limit movement of the hamburger in either direction. Other articles may be supported on similarly shaped supporting members and various condiments, sauces, relishes, and the like normally employed with the food articles may also be supported on the supporting panel 22. The tray may be constructed of any suitable material compatible with the handling of food and which may be easily manipulated. The various score lines or fold lines may be scored for ease in setting up the tray from the flat blank condition as illustrated in FIGURE 6 to the in use position illustrated in FIGURES 1 and 7. This type of tray is especially desirable in the type of food establishments where the customers order and receive their own food from a window opening or the like in a building after which the food products are usually consumed while sitting in an automobile or while standing. The devices also are useful in many other areas and is economically feasible as a disposable or throw-away item.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A portable tray for supporting an article of food and a beverage disposed in a container, said tray including an elongated relatively narrow supporting panel, said supporting panel having an opening therethrough adjacent one end thereof for receiving a beverage container, the remainder of the supporting panel adapted to receive an article of food, relatively narrow vertical wall panels connected to each edge of said supporting panel and forming abutments for preventing lateral movement of the article of food, said beverage container forming an abutment for preventing longitudinal movement of the article of food toward said one end, relatively narrow horizontal top panels connected to the vertical wall panels and extending outwardly therefrom, depending side wall panels connected to the outer edge of the horizontal top panels and extending vertically downwardly therefrom with the bottom edges terminating below the plane of the supporting panel, inwardly extending bottom panels connected to the lower edges of the side wall panels, said bottom panel including means interconnecting the bottom panels for retaining them in assembled position, inwardly extending end panels connected to one end edge of each side wall panel, means interlockingly connecting the end panels thereby retaining the tray in assembled relation, one of said side wall panels being provided with a thumb receiving opening, the other of said side wall panels including an elongated opening for receiving a plurality of fingers from the same hand whereby the tray may be conveniently supported in one hand.

2. The structure as defined in claim 1 wherein said narrow vertical wall panels and narrow horizontal top panels are each provided with transverse spaced perforated lines whereby a portion of each normally vertical wall panel may be disposed in alignment with the supporting panel thereby forming an extension therefor for receiving a hamburger, the portion of each horizontal top wall between the perforated lines forming a vertical wall for retaining the hamburger.

3. The structure as defined in claim 2 wherein the supporting panel is provided with a depending end member overlying said end panels and simulating the head of an animal, said end member having a slit therein in the area of the mouth, and a tab struck out from one of said end panels and extending through the slit for simulating the tongue of an animal and retaining said end member in position.

4. The structure as defined in claim 3 wherein said supporting panel is provided with converging side edges, said container receiving opening being disposed adjacent the longer end edge of the supporting panel and the covergence of the vertical wall panels forming abutments for frictionally gripping and retaining an article of food from becoming dislodged from the narrow end of the supporting panel.

5. A portable tray for supporting an article of food and a beverage disposed in a container, said tray including an elongated relatively narrow supporting panel, said supporting panel having an opening therethrough adjacent one end thereof for receiving a beverage container, the remainder of the supporting panel adapted to receive an article of food, relatively narrow vertical wall panels connected to each edge of said supporting panel and forming abutments for preventing lateral movement of the article of food, said beverage container forming an abutment for preventing longitudinal movement of the article of food toward said one end, relatively narrow horizontal top panels connected to the vertical wall panels and extending outwardly therefrom, depending side wall panels connected to the outer edge of the horizontal top panels and extending vertically downwardly therefrom with the bottom edges terminating below the plane of the supporting panel, inwardly extending bottom panels connected to the lower edges of the side wall panels, said bottom panel including means interconnecting the bottom panels for retaining them in assembled position, inwardly extending end panels connected to one end edge of each side wall panel, means interlockingly connecting the end panels thereby retaining the tray in assembled relation, said container receiver opening being circular in configuration, said opening being normally closed by a pair of opposed semi-circular flaps connected tangentially to the supporting panel at diametrically opposite points along the line of juncture between the supporting panel and the vertical narrow wall panels.

6. A portable tray for supporting an article of food and a beverage disposed in a container, said tray including an elongated relatively narrow supporting panel, said supporting panel having an opening therethrough adjacent one end thereof for receiving a beverage container, the remainder of the supporting panel adapted to receive an article of food, relatively narrow vertical wall panels connected to each edge of said supporting panel and forming abutments for preventing lateral movement of the article of food, said beverage container forming an abutment for preventing longitudinal movement of the article of food toward said one end, relatively narrow horizontal top panels connected to the vertical wall panels and extending outwardly therefrom, depending side wall panels connected to the outer edge of the horizontal top panels and extending vertically downwardly therefrom with the bottom edges terminating below the plane of the supporting panel, inwardly extending bottom panels connected to the lower edges of the side wall panels, said bottom panel including means interconnecting the bottom panels for retaining them in assembled position, inwardly extending end panels connected to one end edge of each side wall panel, means interlockingly connecting the end panels thereby retaining the tray in assembled relation, said narrow vertical wall panels and narrow horizontal top panels being each provided with transverse spaced perforated lines whereby a portion of each normally vertical wall panel may be disposed in alignment with the supporting panel thereby forming an extension therefor for receiving a hamburger, the portion of each horizontal top wall between the perforated lines forming a vertical wall for retaining the hamburger.

7. A portable tray for supporting an article of food and a beverage disposed in a container, said tray including an elongated relatively narrow supporting panel, said supporting panel having an opening therethrough adjacent one end thereof for receiving a beverage container, the remainder of the supporting panel adapted to receive an article of food, relatively narrow vertical wall panels connected to each edge of said supporting panel and forming abutments for preventing lateral movement of the article of food, said beverage container forming an abutment for preventing longitudinal movement of the article of food toward said one end, relatively narrow horizontal top panels connected to the vertical wall panels and extending outwardly therefrom, depending side wall panels connected to the outer edge of the horizontal top panels and extending vertically downwardly therefrom with the bottom edges terminating below the plane of the supporting panel, inwardly extending bottom panels connected to the lower edges of the side wall panels, said bottom panel including means interconnecting the bottom panels for retaining them in assembled position, inwardly extending end panels connected to one end edge of each side wall panel, means interlockingly connecting the end panels thereby retaining the tray in assembled relation, the supporting panel being provided with a depending end member overlying said end panels and simulating the head of an animal, said end member having a slit therein in the area of the mouth, and a tab struck out from one of said end panels and extending through the slit for simulating the tongue of an animal and retaining said end member in position.

8. A portable tray for supporting an article of food and a beverage disposed in a container, said tray including an elongated relatively narrow supporting panel, said supporting panel having an opening therethrough adjacent one end thereof for receiving a beverage container, the remainder of the supporting panel adapted to receive an article of food, relatively narrow vertical wall panels connected to each edge of said supporting panel and forming abutments for preventing lateral movement of the article of food, said beverage container forming an abutment for preventing longitudinal movement of the article of food toward said one end, relatively narrow horizontal top panels connected to the vertical wall panels and extending outwardly therefrom, depending side wall panels connected to the outer edge of the horizontal top panels and extending vertically downwardly therefrom with the bottom edges terminating below the plane of the supporting panel, inwardly extending bottom panels connected to the lower edges of the side wall panels, said bottom panel including means interconnecting the bottom panels for retaining them in assembled position, inwardly extending end panels connected to one end edge of each side wall panel, means interlockingly connecting the end panels thereby retaining the tray in assembled relation, said supporting panel being provided with converging side edges, said container receiving opening being disposed adjacent the longer end edge of the supporting panel and the convergence of the vertical wall panels forming abutments for frictionally gripping and retaining an article of food from becoming dislodged from the narrow end of the supporting panel.

References Cited in the file of this patent

UNITED STATES PATENTS

| | | |
|---|---|---|
| 228,008 | Wenzel | May 25, 1880 |
| 397,227 | De Long | Feb. 5, 1889 |
| 1,833,492 | Miller | Nov. 24, 1931 |
| 2,038,845 | Lock | Apr. 28, 1936 |
| 2,303,264 | Flick | Nov. 24, 1942 |
| 2,447,243 | Freel et al. | Aug. 17, 1948 |
| 2,466,636 | Bruckner et al. | Apr. 5, 1949 |

FOREIGN PATENTS

| | | |
|---|---|---|
| 619,310 | Great Britain | Mar. 8, 1949 |